US012627112B2

(12) United States Patent
Pinna et al.

(10) Patent No.: US 12,627,112 B2
(45) Date of Patent: May 12, 2026

(54) FABRY-PEROT BASED MULTI RESONANT CAVITY TUNABLE LASER

(71) Applicant: ROCKLEY PHOTONICS LIMITED, Altrincham (GB)

(72) Inventors: Sergio Pinna, Santa Barbara, CA (US); Yi Zhang, Pasadena, CA (US); Richard Grote, Rancho Cucamonga, CA (US)

(73) Assignee: Rockley Photonics Limited, Altrincham (GB)

( * ) Notice: Subject to any disclaimer, the term of this patent is extended or adjusted under 35 U.S.C. 154(b) by 690 days.

(21) Appl. No.: 18/085,455

(22) Filed: Dec. 20, 2022

(65) Prior Publication Data

US 2023/0231356 A1     Jul. 20, 2023

Related U.S. Application Data

(60) Provisional application No. 63/292,341, filed on Dec. 21, 2021.

(51) Int. Cl.
| | |
|---|---|
| *H01S 3/083* | (2006.01) |
| *H01S 3/08022* | (2023.01) |
| *H01S 3/082* | (2006.01) |

(52) U.S. Cl.
CPC .......... *H01S 3/083* (2013.01); *H01S 3/08027* (2013.01); *H01S 3/0823* (2013.01)

(58) Field of Classification Search
CPC .... H01S 3/083; H01S 3/08027; H01S 3/0823; H01S 3/08031; H01S 3/08059; H01S 5/142
See application file for complete search history.

(56) References Cited

U.S. PATENT DOCUMENTS

| | | | | |
|---|---|---|---|---|
| 7,065,276 | B2 * | 6/2006 | Scheuer | ............. G02B 6/29343 |
| | | | | 385/50 |
| 2004/0213501 | A1 * | 10/2004 | Chi | .................... G01D 5/35354 |
| | | | | 385/12 |
| 2006/0222038 | A1 * | 10/2006 | Yamazaki | ............. H01S 5/1032 |
| | | | | 372/94 |
| 2016/0204578 | A1 * | 7/2016 | Li | ............................ H01S 5/12 |
| | | | | 372/45.01 |
| 2018/0302167 | A1 * | 10/2018 | Eggleston | ............... H01S 5/142 |

* cited by examiner

*Primary Examiner* — Xinning(Tom) Niu
(74) *Attorney, Agent, or Firm* — Womble Bond Dickinson (US) LLP

(57) ABSTRACT

There is provided a laser, and/or a reflector for a laser cavity comprising: a ring resonator structure; and a Fabry-Perot filter connected in cascade to the ring resonator structure by a coupling waveguide. The coupling waveguide is configured to propagate light having a frequency corresponding to any of the resonant frequencies of the ring resonator structure to the Fabry-Perot filter, and the Fabry-Perot filter is configured to select one or more frequencies and return light having a frequency matching any of the selected frequencies to the ring resonator structure via the coupling waveguide.

10 Claims, 3 Drawing Sheets

300

400

FABRY-PEROT BASED MULTI RESONANT CAVITY TUNABLE LASER

CROSS-REFERENCE TO RELATED APPLICATION(S)

The present application claims priority to and the benefit of U.S. Provisional Application No. 63/292,341, filed Dec. 21, 2021, entitled "FABRY-PEROT BASED MULTI RESONANT CAVITY TUNABLE LASER", the entire content of which is incorporated herein by reference.

FIELD

One or more aspects of embodiments according to the present invention relate to widely tunable, ultra-low linewidth lasers, and more particularly to such lasers implementing a Fabry-Perot structure cascaded with a ring resonator.

BACKGROUND

Widely tunable, ultra-low linewidth lasers (i.e., lasers with less than 10 kHz linewidth) with a high side-mode suppression ratio (for example 30 dB or more) are core components in a multitude of applications including coherent communications, and sensing applications such as LiDAR and spectroscopy amongst others.

In the context of coherent communications, low linewidth and high side-mode suppression ratio (SMSR) are valuable because using lasers with such parameters allow the phase locking circuitry in coherent communication systems to be simplified. Meanwhile, in the context of LiDAR, low linewidth and high side-mode suppression ratio are particularly important because these properties facilitate an improved accuracy for LiDAR sensors, thereby enabling coherent architectures even for long range applications. Further, in the context of spectroscopy, low linewidth and high side mode suppression ratio enable a spectrometer to achieve a higher spectral resolution.

On the other hand, having a wide tuning range yields improvements in coherent communication systems because it allows a single part to be used as a source for any of the International Telecommunication Union (ITU) channels of a communication system. In the context of spectroscopy, using a laser with a wide tuning range is beneficial because it allows the spectrometer to scan a broad spectral range, for example to analyze multiple gas species in the field of gas spectroscopy.

Given the clear importance of both low-linewidth/high-side-mode-suppression-ratio lasers and widely tunable lasers, it is unsurprising that may solutions have been, and are currently being, studied and proposed.

To achieve low linewidth, an ultra-high quality factor cavity is required, this corresponds to a laser with a long effective cavity length. In contrast, achieving a large single longitudinal mode tuning range requires elements with a wide free spectral range (FSR), which corresponds to a small optical path length. Many architectures have been proposed, some based on diffraction gratings—e.g., sampled grating distributed Bragg reflectors (SG-DBR), micro-ring lasers, etc. However, these solutions typically aim to improve either linewidth or tunability, often at the expense of the other. In other words, current solutions typically trade off between linewidth and tunability depending on the context in which the laser is deployed.

As the skilled person will appreciate, in order to achieve a laser source that simultaneously has a narrow linewidth, a broad single-mode tuning range and high side-mode suppression ratio, the common solutions such as distributed feedback (DFB), distributed Bragg reflection DBR) or SG-DBR architectures are insufficient. Those architectures, such as SG-DBR that are able to provide a broad tuning range also suffer from a broad linewidth—typically on the order of a few MegaHertz. Meanwhile, those architectures, such as DFB lasers, that can provide narrow linewidth usually have a very limited tuning range—on the order of a few nanometres.

One approach that attempts to simultaneously achieve low linewidth and wide-range tunability is a high performance laser architecture that creates an external cavity laser configuration based on mechanically tuned diffraction gratings. This architecture, which may be employed in bench-top test equipment can be designed to provide an extremely wide tuning range—in some cases up to over 100 nm around the designated communication band, a narrow linewidth—in the range of tens to hundreds of kilohertz, and an extremely high side-mode suppression ratio—sometimes exceeding 50 dB. However, this solution is physically bulky and different to integrate in some contexts, such as commercial settings.

Alternative solutions that may be easier to integrate into existing infrastructure may exploit the Vernier effect between multiple long high quality factor cavity resonator elements. A common resonator element used in the art is a large-radius (e.g., 20 microns or more) micro-ring structure. If a single resonator structure were used, a reduction in the laser linewidth would typically lead to a corresponding reduction of the resonators free spectral range, and consequently to the laser single-mode tuning range. However, if multiple ring resonators with slightly different free spectral ranges are cascaded, the free spectral range of the overall cascaded structure can be drastically increased. An example of a cascaded micro-ring structure is depicted in FIG. 1.

FIG. 1 shows a laser 100 comprising a front and rear mirror 110, 120, either side of a gain medium 130, thereby defining a laser cavity. The laser further comprises a beam splitter 140 between the front mirror 110 and the gain medium 130. The rear mirror 120 is defined by a further beam splitter 122, a pair of waveguides 124a, 124b each extending from the beam splitter 122 to respectively distal ends of a cascaded micro-ring structure, the cascaded micro-ring structure being defined by a plurality of micro-ring cavities (also referred to equivalently as ring cavities herein) 126a-c connected to each other by waveguides 128a, 128b that are configured to operate as directional couplers. Each of the micro-ring cavities 126a-c may have a different radius and a correspondingly different free spectral range.

In the laser 100 shown in FIG. 1, each of the ring cavities 126a-c is designed to be slightly different from the others. In this way, the Vernier effect can be exploited between multiple long high quality factor cavity resonator elements. For example, if two cavities are cascaded with a free spectral range difference of 10% between them, only one in every ten resonances of the two cavities will overlap, thereby increasing the free spectral range of the overall cascaded architecture by approximately a factor of ten. Moreover, shifting (e.g., by thermally tuning) one of the ring cavities' resonances by just 10% of its free spectral range will then correspond to a cascaded resonance shift of an entire free spectral range of the overall cascaded structure. In this way, a cascaded micro-ring approach allows a narrow linewidth to be obtained, thanks to the high quality factor ring resonator, with an improved tuning range.

However, to achieve this large single longitudinal mode tuning range in practice requires cascading several large ring resonators 126*a-c*, or to introduce in the cascade a filtering element with a large free spectral range. Using many large radius rings presents an issue in terms of structure size and, consequently, cost. On the other hand, a ring resonator element with a large free spectral range (on the order of several tens of nanometres or greater), will require a very small radius of only a few microns that requires sharp waveguide bending. This second approach, while feasible in some silicon photonics platforms, cannot be used in ultra-low low loss fabrication platforms, such as silicon nitride or a large waveguide low loss platform without paying the penalty of ultra-high cavity loss and consequently a drastic reduction in laser performance.

The inventors have devised the present invention in light of the above considerations.

SUMMARY

In a general sense, embodiments of the present invention provide a laser cavity including a Fabry-Perot cavity that is cascaded with one or more ring cavities to form a compact, low-linewidth, broadly tunable, high side-mode suppression ratio laser.

Such an architecture provides a significantly reduced footprint (i.e., area) for the laser when compared with previously considered solutions such as the laser 100 depicted in FIG. 1 without sacrificing performance. The reduction in area of the laser leads to a consequential reduction in the cost and quantity of material required to manufacture and deploy the laser.

In a first aspect, there is provided a laser comprising: a ring resonator structure; and a Fabry-Perot filter connected to the ring resonator structure by a coupling waveguide, wherein the coupling waveguide is configured to propagate light having a frequency corresponding to any of the resonant frequencies of the ring resonator structure to the Fabry-Perot filter, and the Fabry-Perot filter is configured to select one or more frequencies and return light having a frequency matching any of the selected frequencies to the ring resonator structure via the coupling waveguide.

By cascading a Fabry-Perot-based filter with the ring resonator structure, it is possible to provide a large free spectral range (which consequently leads to a wide tuning range), whilst simultaneously benefiting from the narrow linewidth emission and high side-mode suppression ratio from the ring resonator structure. In effect, the cascading of the Fabry-Perot filter with the ring resonator structure provides a laser with a frequency-selective component that achieves narrow linewidth whilst the wide free spectral range of the Fabry-Perot filter ensures a wide tuning range for the laser overall.

In some embodiments, the ring resonator structure together with the Fabry-Perot filter may define one of the reflective ends of a cavity of the laser.

By placing the ring resonator structure together with the Fabry-Perot filter in a position so as to define one of the reflective ends of (i.e., the front or rear mirror of the laser cavity), the footprint of the overall laser can be reduced, thereby reducing the amount of materials and cost associated with building the laser, as well as making it easier for a user to integrate the laser into a pre-existing system.

In some embodiments, the ring resonator structure together with the Fabry-Perot filter may define the rear mirror of the laser cavity.

It may be preferable for the ring resonator structure and Fabry-Perot filter to define the rear mirror of the laser cavity because the architecture may be best suited to having a very high reflectance of the chosen longitudinal mode of the laser, and negligible transmittance. This may make the architecture unsuitable for use as the front mirror of the laser cavity because a certain level of transmittance in the front mirror is required to ensure that the laser emits a beam.

In another aspect, there is provided a reflector for a laser cavity, the reflector comprising: a ring resonator structure; and a Fabry-Perot filter connected in cascade to the ring resonator structure by a coupling waveguide, wherein the coupling waveguide is configured to propagate light having a frequency corresponding to any of the resonant frequencies of the ring resonator structure to the Fabry-Perot filter, and the Fabry-Perot filter is configured to select one or more frequencies and return light having a frequency matching any of the selected frequencies to the ring resonator via the coupling waveguide.

This reflector may, for example, be a rear reflector that can be used to define a rear mirror in a laser cavity. In some examples, it may be possible to install the reflector disclosed herein into a pre-existing laser system to reduce its linewidth, increase its tuning range, and increase its side-mode suppression ratio.

In some embodiments, the Fabry-Perot filter may be a reflective filter.

By providing the Fabry-Perot filter as a reflective filter, the selected frequency of the filter may be back-propagated through the ring resonator structure for a second time, thereby further reducing the linewidth and further suppressing side modes to improve the side-mode suppression ratio. In this way, any linewidth broadening caused by passing light through the Fabry-Perot filter may be counteracted by a second pass through the ring resonator structure whilst retaining the benefit of the large free spectral range imparted by the Fabry-Perot filter.

In some embodiments, the Fabry-Perot filter may be defined by a straight waveguide configured to operate as a Fabry-Perot cavity; and a coupling region of the coupling waveguide, wherein the Fabry-Perot cavity may be coupled to the coupling region of the coupling waveguide.

By constructing the Fabry-Perot cavity as a straight waveguide, it is possible to provide a Fabry-Perot cavity with an arbitrarily short length. This consequently means that a Fabry-Perot cavity with an arbitrarily large free spectral range, and therefore a laser with an arbitrarily large tuning range can be provided. Further, by providing the Fabry-Perot cavity as a straight waveguide, excess losses associated with waveguide bending can be entirely avoided.

Additionally, the coupling of the Fabry-Perot cavity with the coupling waveguide may define a directional coupling. Such a directional coupler allows the manufacturer/user to independently design the reflectivity and the coupling strength of the Fabry-Perot cavity, thus introducing an additional optimization degree of freedom, to fine tune the Fabry-Perot resonator response to achieve the best laser performance. As such, the combination of the Fabry-Perot cavity and the directional coupler can be considered to, together, form a reflective Fabry-Perot filter that preferentially reflects wavelengths in certain wavelength ranges.

In some embodiments, the Fabry-Perot cavity may be coupled to the coupling waveguide by evanescent coupling.

An evanescent coupling is a particularly useful form of directional coupling that leverages the effect of quantum tunnelling to avoid losses associated with introducing an interface between materials of different refractive indices.

In some embodiments, the coupling waveguide may comprise a back-end high-loss propagation region, wherein the coupling region of the coupling waveguide is located between the ring resonator structure and the back-end high-loss propagation region.

In this way, light having a frequency that is not selected to be reflected by the Fabry-Perot filter may be propagated from the ring resonator structure, through the coupling waveguide, to the back-end high-loss propagation region to be dissipated. In this way, interference and leakage of light with unwanted frequencies can be prevented and it can be ensured that the eventually generated light that is output from the laser possesses the desired frequency, linewidth, and side-mode suppression ratio. Dissipation of unwanted frequencies may be desirable to prevent the unwanted reflection and potential accidental lasing of the unwanted frequencies.

In some embodiments, the ring resonator structure may be coupled to the coupling waveguide by evanescent coupling.

As discussed above, evanescent coupling is a particularly useful form of directional coupling that leverages the effect of quantum tunnelling to avoid losses associated with introducing an interface between materials of different refractive indices.

In some embodiments, the coupling waveguide may comprise a front-end high-loss propagation region, wherein the ring resonator structure may be coupled to the coupling waveguide at a position along the coupling waveguide between the Fabry-Perot cavity and the front-end high-loss propagation region.

As with the back-end high-loss propagation region, the front-end high-loss propagation region facilitates the dissipation of unwanted frequencies, in this case frequencies that are reflected from the Fabry-Perot filter back towards the ring resonator structure but are not one of the resonant frequencies of the ring resonator structure can be dissipated, thereby preventing these frequencies from contributing to the eventual laser output.

In some embodiments, the ring resonator structure may comprise a ring resonator coupled to the coupling waveguide.

As discussed above, ring resonators provides low linewidth together with a high side-mode suppression ratio, and so when combined with a Fabry-Perot cavity achieves a laser with low linewidth, high side-mode suppression ratio, and large overall tuning range.

In some embodiments, the coupling waveguide may be a first coupling waveguide, and the ring resonator structure may comprise a ring resonator coupled on a first side to the first coupling waveguide, wherein the ring resonator may be connected, on a second side opposing to the first side, to a gain medium of the laser by a second coupling waveguide.

In this way, amplified light that propagates through the gain medium may be fed through the ring resonator and to the Fabry-Perot cavity to ensure that only frequency components matching resonant frequencies of the overall cascaded structure are preserved. In this way, a high amplitude, narrow linewidth signal can be produced.

In some embodiments, the second coupling waveguide may comprise a high-loss propagation region, wherein the ring resonator may be coupled to the second coupling waveguide at a position along the second coupling waveguide between the gain medium and the high-loss propagation region.

The high-loss propagation region of the second coupling waveguide may fulfil the same role as the front-end and/or back-end high-loss propagation regions of the first coupling waveguide. Namely, frequencies that do not successfully couple into the ring resonator may be propagated into the high-loss propagation region of the second coupling waveguide to ensure that they do not reflect back through the gain medium and inadvertently undergo lasing. In this way, a narrow linewidth for the eventually lased beam can be ensured.

In some embodiments, the ring resonator may coupled to the second coupling waveguide by evanescent coupling.

As discussed above, evanescent coupling is a particularly useful form of directional coupling that leverages the effect of quantum tunnelling to avoid losses associated with introducing an interface between materials of different refractive indices.

In some embodiments, the ring resonator may be a first ring resonator, and the ring resonator structure may comprise one or more further ring resonators, connected to the first ring resonator in cascade, wherein each pair of adjacent ring resonators may be connected by a respective connecting waveguide.

In other words, in some embodiments, the ring resonator structure may comprise a plurality of ring resonators, each connected to one another in cascade, wherein each pair of adjacent ring resonators is connected by a respective connecting waveguide.

Preferably, each of the ring resonators has a different set of resonant frequencies, albeit that each of the ring resonators shares a common set of resonant frequencies, said common set being a subset of the respective set of resonant frequencies for each ring resonator. In practice this may be achieved by varying the radius and/or refractive index of each ring resonator to modify the set of resonant frequencies.

By cascading consecutive ring resonators, it is possible to exploit the Vernier effect wherein only the frequency components are in the common set of resonant frequencies of all the ring resonators are preserved and propagated through the ring resonator structure. For example, as a consequence of the Vernier effect, if the free spectral range of two adjacent ring resonators differs by 10%, only one in every ten free spectral ranges (i.e., only one in every ten resonant frequencies) of the ring resonators will match this condition, thereby facilitating a considerable increase in the overall cascaded free spectral range output (i.e., the distance in frequency-space between two adjacent 'peak' signals) from the ring resonator structure.

In some embodiments, one or more of the connecting waveguides may be a straight waveguide.

In some examples, all of the connecting waveguides may be a straight waveguide. By providing connecting waveguides as straight waveguides, excess losses associated with waveguide bending can be entirely avoided.

In some embodiments, one or more of the connecting waveguides may comprise: a respective high-loss propagation region, wherein each of the ring resonators may be coupled to a corresponding one or more of the connecting waveguides at a position along said connecting waveguide distal from the respective high-loss propagation region.

In some examples, all of the connecting waveguides may comprise a respective high-loss propagation region.

As discussed above in relation to the first and/or second coupling waveguides, the high-loss propagation region(s) of the one or more connecting waveguides may ensure that frequencies that do not successfully couple into correspondingly coupled ring resonator(s) do not continue to propagate through the laser cavity and inadvertently parasitically lase. Due to the directional nature of propagation through cascaded ring resonators (i.e., the propagation between adjacently cascaded ring resonators alternates between clockwise propagation for a first ring resonator, anti-clockwise propagation for a second ring resonator, clockwise propagation for a third ring resonator, etc.), it may only be necessary to provide high-loss propagation regions at one end of the connecting waveguide, particularly if there are considerations related to reducing the overall footprint/size of the laser.

In some embodiments, one or more of the connecting waveguides having a high-loss propagation region may further comprise: a further high-loss propagation region, wherein each of the ring resonators coupled to the respective connective waveguide may be coupled at positions along the respective connecting waveguide between the high-loss propagation regions.

In some examples, all the connecting waveguides may comprise a further respective high-loss propagation region.

Providing a further high-loss propagation region to the connecting waveguide may ensure that there is a high-loss propagation region at each of the connecting waveguides thereby ensuring that frequencies that do not successfully couple into correspondingly coupled ring resonator(s) and propagating in either direction through the respective connecting waveguide do not continue to propagate through the resonator structure. This ensures that these non-resonant frequencies are effectively dumped from propagating, thus preventing these non-resonant frequencies from lasing. This therefore promotes a narrow linewidth for the output of the laser.

In some embodiments, the coupling waveguide may be a first waveguide, and a first ring resonator amongst the plurality of ring resonators may be connected to a gain medium of the laser by a second coupling waveguide; and a last ring resonator amongst the plurality of ring resonators may be coupled to the first coupling waveguide.

In this way, amplified light that propagates through the gain medium may be fed through the ring resonator structure and to the Fabry-Perot cavity to ensure that only frequency components matching resonant frequencies of the overall cascaded structure are preserved. In this way, a high amplitude, narrow linewidth signal can be produced.

In some embodiments, the second coupling waveguide may comprise a high-loss propagation region, wherein the first ring resonator may be coupled to the second coupling waveguide at a position along the second coupling waveguide between the gain medium and the high-loss propagation region.

The high-loss propagation region of the second coupling waveguide may fulfil the same role as the front-end and/or back-end high-loss propagation regions of the first coupling waveguide. Namely, frequencies that do not successfully couple into the first ring resonator may be propagated into the high-loss propagation region of the second coupling waveguide to ensure that they do not reflect back through the gain medium and inadvertently undergo lasing. In this way, a narrow linewidth for the eventually lased beam can be ensured.

In some embodiments, the first ring resonator may be coupled to the second coupling waveguide by evanescent coupling.

As discussed above, evanescent coupling is a particularly useful form of directional coupling that leverages the effect of quantum tunnelling to avoid losses associated with introducing an interface between materials of different refractive indices.

As the skilled person will appreciate any of the embodiments described herein may be combined in any combination without limitation, save for when such a combination would lead to a result that is physically or logically unfeasible.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a laser provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 2:
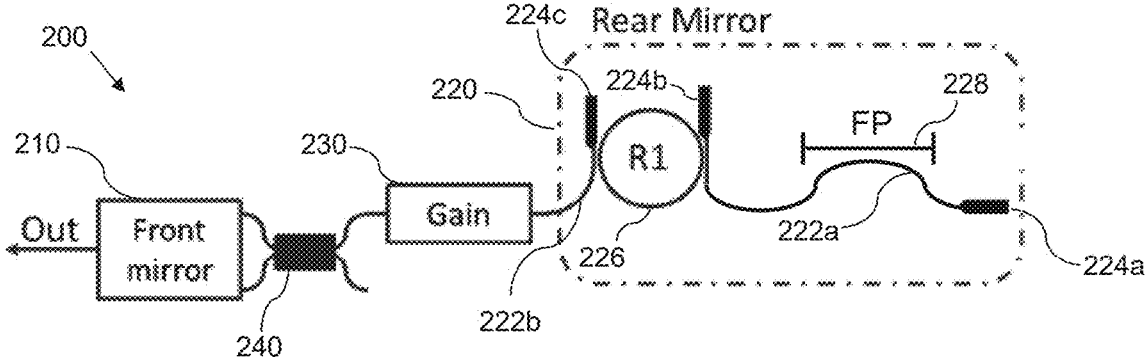
FIG. 2 shows a laser in accordance with some embodiments of the present invention.

FIG. 2 shows a laser 200 in accordance with the present disclosure. The laser 200 comprises a front mirror 210, a rear mirror 220, a gain medium 230 disposed therebetween, and, in some examples, a beam splitter 240 disposed between the front mirror 210 and the gain medium 230. The front mirror 210 may be any suitable reflector, and preferably may be a reflector with a wideband high reflectivity coating, or a tunable reflectivity. For example, the front mirror 210 may be a Sagnac mirror or similar.

The structure of the rear mirror 220 will be discussed in further detail below.

The gain medium 230 may be any suitable gain medium and may be disposed within an active region of a waveguide that defines a part of the laser cavity of the laser 200. For example, the gain medium may comprise ion implanted Neodymium or Titanium (e.g., Nd:YAG, Ti:Sapphire, Nd:Sapphire, $Nd:TaO_3$, $Nd:Ta_2O_5$, etc.). Alternatively, the gain medium may comprise one or more semiconductor solids such as aluminum, gallium, or an arsenide compound. In some examples the gain medium may be an optical fiber doped with a rare-earth element such as erbium, ytterbium, neodymium, dysprosium, praseodymium, thulium, or holmium. Other options for gain media are also envisaged. Preferably the gain medium 230 defines a broadband optical gain section. In particular, the bandwidth over which the gain medium 230 achieves gain should be larger than several times the free spectral range of the cascaded structure that defines the rear mirror 220.

The front mirror 210 may be connected by waveguides to both entrance arms of the beam splitter 240. One of the exit arms of the beam splitter 240 may be connected directly to a waveguide comprising the gain medium 230. The waveguide comprising the gain medium 230 may, in turn, be connected directly to the rear mirror 220

The rear mirror 220 may be defined by the cascaded structure of the present disclosure. This structure comprises a plurality of coupling waveguides 222a, 222b, each of which comprises one or more high-loss propagation regions 224a-c that respectively connect a ring resonator 226 to a Fabry-Perot cavity 228 (via the first coupling waveguide 222a), and the ring resonator 226 to the gain medium 230 (via the second coupling waveguide 222b). In some examples, the ring resonator 226 may be coupled to each of the first and second coupling waveguides 222a-b by evanescent coupling. Similarly, the Fabry-Perot cavity 228 may be coupled to the first coupling waveguide 22a by evanescent coupling. In some examples, the coupling waveguides 222a, 222b may be arranged in a curved or undulating shape to connect the ring resonator 226 to the gain medium 230 and to the Fabry-Perot cavity 228.

The coupling of each of the cascaded elements to the coupling waveguides 222a-b exploits the process of quantum tunnelling of photons between two adjacent waveguides through a barrier having a high index of refraction (e.g., the walls of the waveguides). As discussed above, evanescent coupling may allow for efficient coupling of light propagating from one component of the laser cavity to another without risking the introduction of losses associated with providing a physical interface between materials of different refractive indices.

The high-loss propagation regions 224a-c at the ends of the coupling waveguides 222a-b are configured to dissipate frequency components of light that is propagating through the laser cavity that does not match a resonant frequency of the cascaded structure. For example, the high-loss propagation region 224a located at the end of the first coupling waveguide 222a proximal to the Fabry-Perot cavity 228 may be configured to dissipate frequency components that are not selectively reflected by the Fabry-Perot cavity 228 (as is discussed in more detail below). Meanwhile, the high-loss propagation region 224b at the end of the first coupling waveguide 222a proximal to the ring resonator 226 may be configured to dissipate frequency components returned to the ring resonator 226 from the Fabry-Perot cavity 228 that do not match any of the resonant frequencies of the ring resonator 226. Similarly, the high-loss propagation region 224c at the end of the second coupling waveguide 222b proximal to the ring resonator 226 may be configured to dissipate the frequency components propagated to the ring resonator 226 from the gain medium 230 that do not match any of the resonant frequencies of the ring resonator 226.

The high-loss propagation regions 224a-c may be provided by tapering ends of the first and/or second coupling waveguides 422a, 422b to a larger cross-section that is lossy across the operating wavelengths of the laser. In other examples, the high-loss propagations regions 424a-c and any further high-loss propagation regions may be formed by placing a high-loss dielectric (e.g., a conductive rubber material) in the active region of the waveguide. It is envisaged that other means of providing the high-loss propagation regions are available.

The ring resonator 226 is defined by a waveguide that is turned back on itself to form a loop. Light that is propagating at a resonant frequency of the ring resonator 226 will be resonantly amplified while light propagating at non-resonant frequencies will experience loss in the resonator 226 and be dissipated. The resonance condition for a ring resonator 226 can be most efficiently defined in terms of the wavelength of the propagating light as:

$$m\lambda_m = 2\pi r n_{eff} \tag{1}$$

wherein m is the mode number of the ring resonator 226, $\lambda_m$ is the wavelength of the m-th mode, r is the radius of the ring resonator 226, and $n_{eff}$ is the effective refractive index of the ring resonator 226. Light having a frequency resonant with the ring resonator 226 will typically have a wavelength on the same order of magnitude as the radius of the ring resonator 226 or less. Therefore, providing a low linewidth, high side-mode suppression ratio, highly tunable laser that operates in the micron regime requires the provision of ring resonators having a radius on the order of 1 μm—such ring resonators may be referred to as 'microrings'. In some examples, the ring resonator 226 may have a radius of approximately 5 microns, and may be formed by a waveguide having an active region that could be formed from Silicon, and a passive region that could be formed from Silica, $SiO_2$, the silicon region having an effective index of refraction of, for example, approximately 3.5 across the operating wavelengths of the laser. Other configurations for the ring resonator 226 are also possible.

Meanwhile, the free spectral range of ring resonator 226 can be determined as the inverse of the amount of time it takes for light to carry out one round trip of the ring resonator 226. In other words, the free spectral range of the ring resonator 226 can be expressed as:

$$\Delta v_{FSR}^{rr} = \frac{c}{2\pi r n_{eff}} \tag{2}$$

where $$\Delta v_{FSR}^{rr}$$

in Equation (2) is the free spectral range of a ring resonator. Amplified light that is successfully amplified by the gain medium 230 is propagated through the second coupling waveguide 222b to the ring resonator 226. Frequency components of that amplified light that match any of the resonant frequencies of the ring resonator 226 evanescently couple into the ring resonator and are propagated therethrough. Meanwhile, frequency components of the amplified light that do not match any of the resonant frequencies of the ring resonator 226 are dissipated via propagation through the high-loss propagation region 224c of the second coupling waveguide 222b, as discussed above.

The frequency components that propagate through the ring resonator 226 subsequently evanescently couple to the first coupling waveguide 222a and propagate towards the Fabry-Perot cavity 228.

Figure 3:
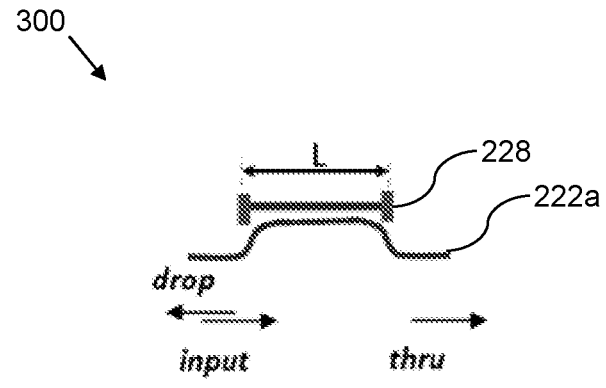
FIG. 3 shows a schematic of the Fabry-Perot cavity shown in FIG. 2 directionally coupled with a waveguide.

Fabry-Perot cavity 228, together with a coupling region of the first coupling waveguide 222a may define a Fabry-Perot filter 300, as illustrated in FIG. 3. The Fabry-Perot filter 300 is a selectively reflective filter comprising a directional coupler between the first coupling waveguide 222a and a straight waveguide portion of length, L, that defines the Fabry-Perot cavity 228. This Fabry-Perot cavity 228 is, in effect, an etalon having a free spectral range of:

$$\Delta v_{FSR}^{FP} = \frac{c}{2Ln_{eff}^*} \qquad (2)$$

where $$\Delta v_{FSR}^{FP}$$

is the free spectral range of the Fabry-Perot cavity 228, L is the length of the Fabry-Perot cavity 228 (as above), and $$n_{eff}^*$$

is the effective index of refraction of the Fabry-Perot cavity 228.

As the Fabry-Perot cavity 228 is formed from a straight waveguide, the length of the Fabry-Perot cavity 228 can be made arbitrarily short thus providing an arbitrarily large free spectral range without risking unnecessary losses that are caused by sharp waveguide bending. These losses associated with sharp waveguide bending may place a limit on the smallest feasible size for ring resonator 226. As such, the free spectral range of the laser may be overall determined by the free spectral range of the Fabry-Perot cavity 228. In some embodiments, the length of the Fabry-Perot cavity 228 may be adjustable to provide tunability to the laser 200. In some examples, the Fabry-Perot cavity 228 may, for example, be defined by a straight waveguide with two cleaved facets. In some examples, the Fabry-Perot cavity 228 may have a length of 0.1 centimetres or more, 0.5 centimetres or more, 1 centimetre or more, 2 centimetres or more, or 5 centimetres or more. In some examples, the Fabry-Perot cavity 428 may have an effective index of refraction between 1 and 5, for example the effective index of refraction may be 1.4 or more, 1.8 or more, 2.0 or more, 2.5 or more, 3.0 or more, or 3.5 or more. In a particular example where the Fabry-Perot cavity 428 is a silicon waveguide, the effective index of refraction may be approximately 3.5 across the operating wavelengths of the laser. In some examples, the Fabry-Perot cavity 428 may be formed from a rib waveguide, a ridge waveguide, or a strip-loaded waveguide; the use of other waveguides to form the Fabry-Perot cavity are also envisaged. The Fabry-Perot cavity 428 may be formed, for example, in a waveguide formed from Silicon (as the optically confining region) and Silica, $SiO_2$ (as the low-refractive index region), but other materials for the formation of the Fabry-Perot cavity are also envisaged.

As mentioned above, the frequency components having frequencies that match resonant frequencies of the ring resonator 226 are propagated to the Fabry-Perot cavity 228 through the first coupling waveguide 222a. These frequency components are then evanescently coupled into the Fabry-Perot cavity 228. Those frequency components that match one of the resonant frequencies of the Fabry-Perot cavity 228 (expressed as $$v_q = q\left(\Delta v_{FSR}^{FP}\right)$$

where q is the mode number, and $v_q$ is the frequency of the q-th mode) are reflected back towards the ring resonator 226 through the first coupling waveguide 222a. Meanwhile, those frequency components that do not match any of the resonant frequencies of the Fabry-Perot cavity 228 are propagated through the first coupling waveguide to the back-end (i.e., the end proximal to the Fabry-Perot cavity 228) high-loss propagation region 224a to be dissipated.

Those frequency components having doubly-resonant frequencies, i.e., those frequency components that match a resonant frequency of both the ring resonator 226 and the Fabry-Perot cavity 228 are reflected back towards the ring resonator 226 through the first coupling waveguide 222a. However, the reflected frequencies will inherit a linewidth associated with the Fabry-Perot cavity 228 which may be larger than the linewidth associated with the ring resonator. Accordingly, some of the reflected frequencies may successfully (evanescently) couple to the ring resonator, while others of the reflected frequencies may not be successfully coupled and therefore propagate through the first coupling waveguide 222a to the front-end (i.e., the end of the first coupling waveguide 222a proximal to the ring resonator 226) high-loss propagation region 224b of the first coupling waveguide 222a. in this way, any excess linewidth incorporated into the signal by reflection within the Fabry-Perot cavity can be filtered out on the 'back-pass' through the ring resonator 226.

The doubly-resonant and filtered frequency components are then propagated back through the ring resonator 226 where they are evanescently coupled into the second coupling waveguide 222b and subsequently propagated through the gain medium 240 for further amplification. In this way the cascaded structure defined by the ring resonator and Fabry-Perot cavity 228 can be seen as defining a tunable filtering rear mirror 220 for the laser 200, with the gain medium 230 and the front mirror 210 configured to operate in the same way as for a standard laser cavity.

Figure 4:
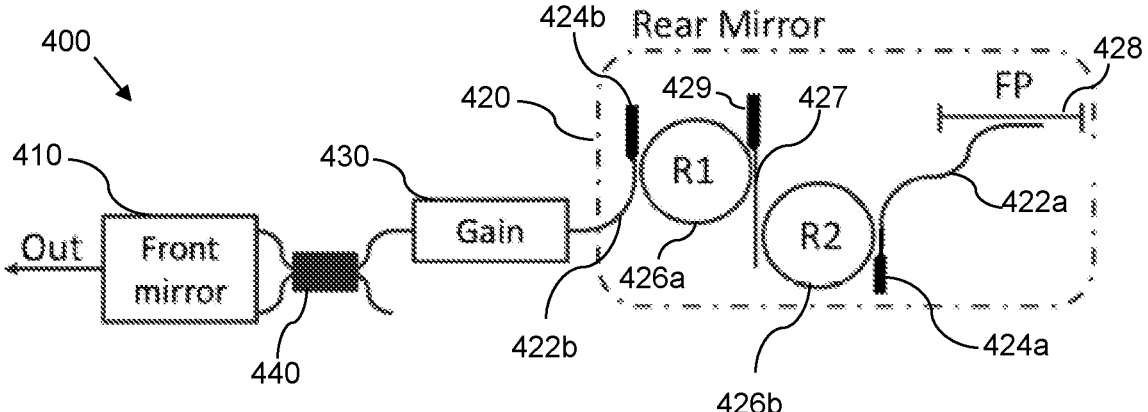
FIG. 4 shows an alternative laser in accordance with some embodiments of the present invention, the laser comprising a plurality of ring resonators.

FIG. 4 shows an alternative laser 400 in accordance with the present disclosure. The laser 400 comprises a front mirror 410, a rear mirror 420, a gain medium 430 disposed therebetween, and, in some examples, a beam splitter 440 disposed between the front mirror 410 and the gain medium 430. The front mirror 410 may be any suitable reflector, and preferably may be a reflector with a wideband high reflectivity coating, or a tunable reflectivity. For example, the front mirror 410 may be a Sagnac mirror or similar.

The structure of the rear mirror 420 will be discussed in further detail below.

The gain medium 430 may be any suitable gain medium and may be disposed within an active region of a waveguide that defines a part of the laser cavity of the laser 200. For example, the gain medium may comprise ion implanted Neodymium or Titanium (e.g., Nd:YAG, Ti:Sapphire, Nd:Sapphire, Nd:TaO$_3$, Nd:Ta$_2$O$_5$, etc.). Alternatively, the gain medium may comprise one or more semiconductor solids such as aluminum, gallium, or an arsenide compound. In some examples the gain medium may be an optical fiber doped with a rare-earth element such as erbium, ytterbium, neodymium, dysprosium, praseodymium, thulium, or holmium. Other suitable gain media may also be used. Preferably the gain medium 430 defines a broadband optical gain section. In particular, the bandwidth over which the gain medium 430 achieves gain should be larger than several times the free spectral range of the cascaded structure that defines the rear mirror 420.

The front mirror 410 may be connected by waveguides to both entrance arms of the beam splitter 440. One of the exit arms of the beam splitter 440 may be connected directly to a waveguide comprising the gain medium 430. The waveguide comprising the gain medium 430 may, in turn, be connected directly to the rear mirror 420.

The rear mirror 420 may be defined by the cascaded structure of the present disclosure. This structure comprises a plurality of coupling waveguides 222a, 222b, each of which comprises one or more high-loss propagation regions 424a, 424b that respectively connected a 'last' ring resonator 426b of a ring resonator structure to a Fabry-Perot cavity 428 (via the first coupling waveguide 422a), and a 'first' ring resonator 426a of the same ring resonator structure to the gain medium 230 (via the second coupling waveguide 422b). In the example shown in FIG. 4, the ring resonator structure comprises a first ring resonator 426a connected, via a connecting waveguide 427 (that itself comprises one or more high-loss propagation regions 429), to a second ring resonator 426b. However, other numbers of ring resonators 426a, *b* are possible and encompassed by the disclosure herein provided that they are connected in cascade by respective connecting waveguides 427.

In some examples, the first ring resonator 426a may be coupled to the second coupling waveguide 422b and to the connecting waveguide 427 by evanescent coupling. Similarly, the second ring resonator 426b may be coupled to the first coupling waveguide 422a and to the connecting waveguide 427 by evanescent coupling. Similarly, the Fabry-Perot cavity 428 may be coupled to the first coupling waveguide 422a by evanescent coupling.

The coupling of each of the cascaded elements to the coupling and connecting waveguides 422a, 422b, 427 exploits the process of quantum tunnelling of photons between two adjacent waveguides through a barrier having a high index of refraction (e.g., the walls of the waveguides). As discussed above, evanescent coupling may allow for efficient coupling of light propagating from one component of the laser cavity to another without risking the introduction of losses associated with providing a physical interface between materials of different refractive indices.

The high-loss propagation regions 424a, 424b and 429 at the ends of the coupling waveguide 422a, 422b and connecting waveguide 427 are configured to dissipate frequency components of light that is propagating through the laser cavity that does not match a resonant frequency of the cascaded structure. In FIG. 4, each of the coupling waveguides 422a, 422b and the connecting waveguide 427 are depicted having only a single high-loss propagation region, although in other examples, the first coupling waveguide 422a may comprise a further single high-loss propagation region at an end of the first coupling waveguide 422a distal from the high-loss propagation region 424a. Similarly, the connecting waveguide 427 may comprise a further high-loss propagation region at an end of the connecting waveguide distal from the high-loss propagation region 429. In examples where there are more than two ring resonators 426a, 426b and consequently more than one connecting waveguide 427, one or more of the connecting waveguides may comprise a high-loss propagation region at an end of the respective connecting waveguide and, optionally, may further comprise a further high-loss propagation region at an end of the respective connecting waveguide distal from the first high-loss propagation region.

As an example, the high-loss propagation region 424a located at the end of the first coupling waveguide 422a proximal to the second ring resonator 426b may be configured to dissipate the frequency components that are reflected from the Fabry-Perot cavity 428 towards the second ring resonator 426b that are not resonant with said second ring resonator 426b. The further high-loss propagation region located at the end of the first coupling waveguide 422a distal from the high-loss propagation region 424a may be configured to dissipate the frequency components that are not selectively reflected by the Fabry-Perot cavity 428. Meanwhile, the high-loss propagation region 424b at the end of the second coupling waveguide 422b proximal to the first ring resonator 426a may be configured to dissipate the frequency components propagated to the first ring resonator 426 from the gain medium 430 that do not match any of the resonant frequencies of the first ring resonator 426.

Similarly, the high-loss propagation region 429 of the connecting waveguide 427 may be configured to dissipate those frequency components returned to the first ring resonator 426a from the second ring resonator 426b that do not match a resonant frequency of the first ring resonator 426a. Meanwhile, a further high-loss propagation region at an end of the connecting waveguide 427 distal from the high-loss propagation region 429 may be configured to dissipate those frequency components propagated to the second ring resonator 426b from the first ring resonator 426a that do not match a resonant frequency of the second ring resonator 426b.

As discussed above, the high-loss propagation regions 424a, 424b, 429, and any further high-loss propagation regions may be provided by tapering the first and/or second coupling waveguides 422a, 422b and/or the connecting waveguide 427 to a larger cross-section that is lossy across the operating wavelengths of the laser. In other examples, the high-loss propagations regions 424a, 424b, 429, and any further high-loss propagation regions may be formed by placing a high-loss dielectric (e.g., a conductive rubber material) in the active region of the waveguide. It is envisaged that other means of providing the high-loss propagation regions are available.

Both the first and second ring resonators 426a, 426b are defined by respective waveguides that are turned back on themselves to form a loop. As discussed above, light that is propagating at a resonant frequency of one of the ring resonators 426a, 426b will be resonantly amplified therein while light propagating at non-resonant frequencies will experience loss in said ring resonator and be dissipated.

In order to increase the overall tuning range of the laser 400, reduce the linewidth, and increase the side-mode suppression ratio, the first and second ring resonators are preferably provided with a slightly different set of resonant frequencies—i.e., with a different free spectral range. This can be achieved by providing first and second ring resonators 426a, 426b with slightly different radii and/or different indices of refraction. For ease of manufacturing, it may be preferable that the first and second ring resonators 426a, 426b are manufactured from the same material(s). This would mean that the first and second ring resonators 426a, 426b have the same index of refraction and, therefore, that any difference in their free spectral ranges must be a consequence of a difference in their radii. For example, the first and second ring resonators may both be formed by a waveguide having an active region formed from Silicon, and a passive region formed from Silica, $SiO_2$, the silicon region having an index of refraction of approximately 3.5 across the operating wavelengths of the laser, but the first ring resonator 426a may have a radius of approximately 5 microns, while the second ring resonator 426b has a different radius of approximately 4.5 microns (i.e., the radii of the first and second ring resonators 426a, 426b may differ by 10%). With these properties, the first ring resonator 426a may have a first set of resonant frequencies, while the second ring resonator 426b may have a second different set of resonant frequencies, wherein the first and second sets of resonant frequencies have some common resonant frequencies. Approximately one in every ten resonant frequencies of the first set may be found in the second set in the case that the difference in radii between the first and second ring resonator 426a, 426b is 10%. Other configurations for each of the first and second ring resonators 426a, 426b are also envisaged, particularly other combinations of radii for the first and second ring resonators.

Importantly, if the radii of the first and second ring resonator 426a, 426b are only slightly different—i.e., the free spectral ranges of the first and second ring resonator 426a, 426b are only slightly different then the Vernier effect may be exploited. For example, if the first and second ring resonators 426a, 426b have a 10% difference in their free spectral ranges then only on in every ten resonance frequencies of the first and second ring resonators 426a, 426b will match. The consequence of this is that only one in every ten resonant frequencies of the first ring resonator 426a will be successfully propagated through the second ring resonator 426b. This, in effect, increases the free spectral range of the overall cascaded structure by a factor of ten, thereby significantly improving the overall tunability of the laser 400. Further, because of the increased filtering provided by the second ring resonator 426b on top of that already provided by the first ring resonator 426a, it is possible to obtain a much narrower linewidth than is achievable with a single ring resonator.

Amplified light that is successfully amplified by the gain medium 430 is propagated through the second coupling waveguide 422b to the first ring resonator 426a. Frequency components of that amplified light that match any of the resonant frequencies of the ring resonator 426 are evanescently coupled into the first ring resonator 426a and propagated therethrough. Meanwhile, frequency components of the amplified light that do not match any of the resonant frequencies of the first ring resonator 426a are dissipated via propagation through the high-loss propagation region 424b of the second coupling waveguide 422b, as discussed above.

The frequency components that propagate through the first ring resonator 426a subsequently evanescently couple to the connecting waveguide 427 and propagate towards the second ring resonator 426b.

Those frequency components from the first ring resonator 426a that also match one of the resonant frequencies of the second ring resonator 426b are evanescently coupled into the second ring resonator 426b and propagated therethrough. Meanwhile, frequency components of the propagated light that do not match any of the frequency components of the second ring resonator 426b are dissipated, in some examples via propagation through a high-loss propagation region of the connecting waveguide 427 at an end of the connecting waveguide 427 proximal to the second ring resonator 426b (said high-loss propagation region is not shown in FIG. 4).

Fabry-Perot cavity 428 together with a coupling region of the first coupling waveguide 422a may define a Fabry-Perot filter, similar to as described above in relation to FIG. 3. The Fabry-Perot filter is a selectively reflective filter comprising a direction coupler between the first coupling waveguide 422a and a straight waveguide portion that defines the Fabry-Perot cavity 428. As described above, this Fabry-Perot cavity is, in effect, an etalon.

As the Fabry-Perot cavity 428 is formed from a straight waveguide, the length of the Fabry-Perot cavity 428 can be made arbitrarily short thus providing an arbitrarily large free spectral range without risking unnecessary losses that are caused by sharp waveguide bending. These losses associated with sharp waveguide bending may place a limit on the smallest feasible size for the first and second ring resonators 426a, 426b. As such, the free spectral range of the laser may be overall determined by the free spectral range of the Fabry-Perot cavity 428. In some embodiments, the length of the Fabry-Perot cavity 428 may be adjustable to provide tunability to the laser 400. In some examples, the Fabry-Perot cavity 428 may, for example, be defined by a straight waveguide with two cleaved facets. In some examples, the Fabry-Perot cavity 428 may have a length of 0.1 centimetres or more, 0.5 centimetres or more, 1 centimetre or more, 2 centimetres or more, or 5 centimetres or more. In some examples, the Fabry-Perot cavity 428 may have an effective index of refraction between 1 and 5, for example the effective index of refraction may be 1.4 or more, 1.8 or more, 2.0 or more, 2.5 or more, 3.0 or more, or 3.5 or more. In a particular example where the Fabry-Perot cavity 428 is a silicon waveguide, the effective index of refraction may be approximately 3.5 across the operating wavelengths of the laser. In some examples, the Fabry-Perot cavity 428 may be formed from a rib waveguide, a ridge waveguide, or a strip-loaded waveguide. The Fabry-Perot cavity 428 may be formed, for example, in a waveguide formed from Silicon (as the optically confining region) and Silica, $SiO_2$ (as the low-refractive index region), but other materials could also be used to form the Fabry-Perot cavity 428.

As mentioned above, the frequency components having frequencies that match resonant frequencies of the second ring resonator 426b are propagated to the Fabry-Perot cavity 428 through the first coupling waveguide 422a. These frequency components are then evanescently coupled into the Fabry-Perot cavity 428. Those frequency components that match one of the resonant frequencies of the Fabry-Perot cavity 428 are reflected back towards the second ring resonator 426b through the first coupling waveguide 422a. Meanwhile, those frequency components that do not match any of the resonant frequencies of the Fabry-Perot cavity 428 are dissipated, in some examples by propagation through the first coupling waveguide 422a to a high-loss propagation region at an end of the first coupling waveguide 422a proximal to the Fabry-Perot cavity 428 (said high-loss propagation region is not pictured in FIG. 4).

Those frequency components having multiply-resonant frequencies (i.e., those frequency components that match a resonant frequency of both of the first and second ring resonators 426a, 426 and of the Fabry-Perot cavity 428 are reflected back towards the second ring resonator 426b through the first coupling waveguide 422a. However, the reflected frequencies will inherit a linewidth associated with the Fabry-Perot cavity 428 which may be larger than the linewidth associated with the second ring resonator 426b. Accordingly, some of the reflected frequencies may successfully (evanescently) couple to the second ring resonator 426b, while others of the reflected frequencies may not be successfully coupled and therefore propagate through the first coupling waveguide 422a to the front-end (i.e., the end of the first coupling waveguide 422a proximal to the second ring resonator 426b) high-loss propagation region 424b of the first coupling waveguide 422a. in this way, any excess linewidth incorporated into the signal by reflection within the Fabry-Perot cavity can be filtered out on the 'back-pass' through the second ring resonator 426*b*.

Subsequently, those frequency components from the second ring resonator 426*b* that also match one of the resonant frequencies of the first ring resonator 426*a* are evanescently coupled into the first ring resonator 426*a* and propagated therethrough. Meanwhile, frequency components of the propagated light that do not match any of the frequency components of the first ring resonator 426*a* are dissipated, in some examples via propagation through the high-loss propagation region 429 of the connecting waveguide 427 at an end of the connecting waveguide 427 proximal to the first ring resonator 426*a*.

The multiply-resonant and filtered frequency components are then propagated back through the first ring resonator 426*a* where they are evanescently coupled into the second coupling waveguide 422*b* and subsequently propagated through the gain medium 440 for further amplification. In this way the cascaded structure defined by the ring resonators 426*a*, 426*b* and Fabry-Perot cavity 428 can be seen as defining a tunable filtering rear mirror 420 for the laser 400, with the gain medium 430 and the front mirror 410 configured to operate in the same way as for a standard laser cavity.

A particular benefit of the laser setup depicted in FIG. 4 is that the footprint of the laser 400 is approximately 30% smaller than the footprint that is achievable with a laser of similar performance that implements three cascaded ring resonators in place of two ring resonators 426*a*, 426*b* cascaded with a Fabry-Perot cavity 428.

Figure 5:
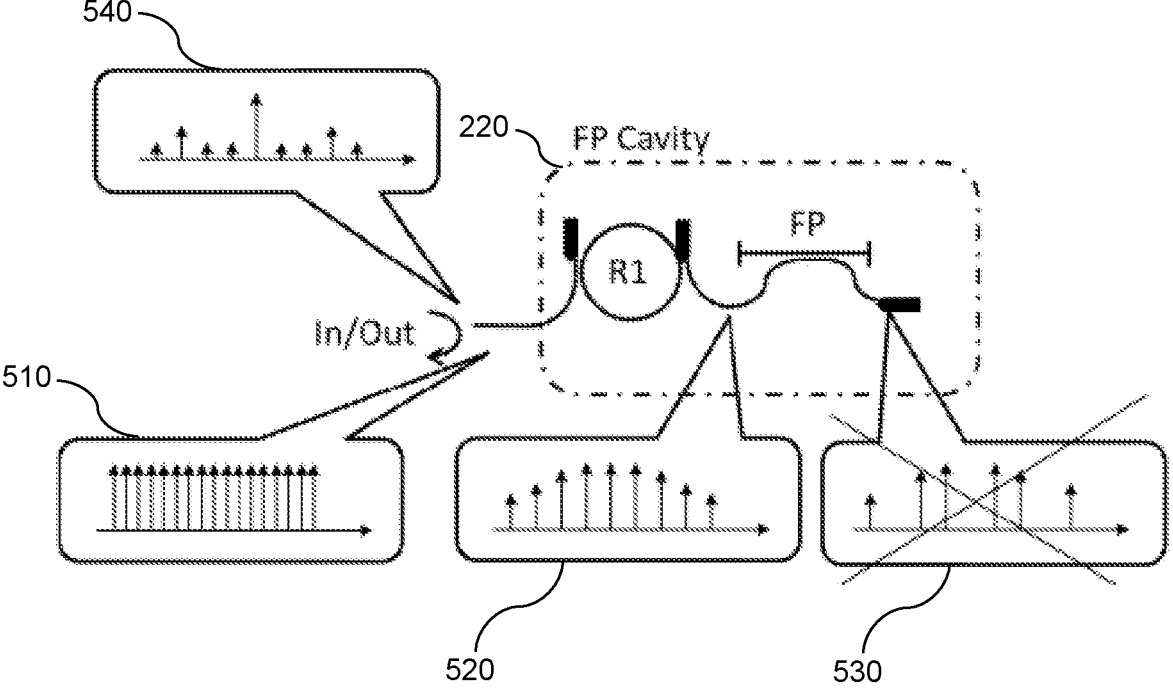
FIG. 5 shows a schematic indicative of the bandwidth of light, at various stages, being propagated through the back end of the laser of FIG. 2.

FIG. 5 shows a schematic indicative of the bandwidth of light, at various stages, being propagated through the back end of the laser 200 of FIG. 2.

In a first stage 510, broadband amplified light from the gain medium 230 is propagated through the second coupling waveguide 222*b* towards the ring resonator 226. The amplitude of the propagating light, in this example, is independent of frequency.

In a second stage 520, following propagation of resonant frequencies through the ring resonator 226, the bandwidth of the ring-resonator-filtered light can be seen to have an amplitude vs. frequency dependency centred on a (central) resonant frequency, wherein the amplitude of light passed through the ring resonator 426 falls as the frequency departs from the resonant frequency. The dependency of amplitude on frequency may take the form of a Lorentzian, or possibly Gaussian, function centred on the resonant frequency.

In a third stage 530, the suppressed wavelengths that are dissipated at high-loss propagation region 224*a* (as a result of not being a resonant frequency of the Fabry-Perot cavity 228) can be seen. In particular, it can be seen that a large number of the side modes of the centrally resonant frequency have been dissipated in the high-loss propagation region 224*a*. As such, a reduced number of frequency components are reflected back from the Fabry-Perot cavity 228 towards the ring resonator 226.

Finally, at stage 540, the output returned to the gain medium 230 can be seen. After being passed back through the ring resonator 226, it can be clearly seen that the overall output of the rear reflector 220 has a strong central peak with excellent side-mode suppression ratio and a narrow linewidth (the linewidth being defined by the full-width half-maximum of the central resonant peak).

Accordingly, it can be seen from the illustration of FIG. 5 that a low-linewidth, broadly-tunable, high side-mode suppression ratio laser can be provided according to the disclosure herein, notably with a significantly smaller footprint and structural complexity than has been achieved with other means.

As discussed above, widely tunable, high side mode suppression ratio and ultra low linewidth lasers (<10 kHz linewidth) are a key component in a multitude of applications, such as coherent communications, sensing (LiDAR, spectroscopy etc.) etc. The low linewidth and high side mode suppression ratio are important as they benefit LiDAR sensors accuracy, enabling coherent architectures even for long range applications, allow to achieve high spectral resolution in spectroscopic sensors, or simplify phase locking circuitry in coherent communication systems. On the other end, the wide tuning range allows to scan a broad spectral range to analyze multiple gas species or allowing to have a single part number able to be used as a source for any of the ITU channels of a communication system. Given the importance of such an element, many solutions have been, and are currently, studied and proposed. In order to achieve low linewidth an ultra-high quality factor cavity is required; this corresponds to a long effective cavity length. On the contrary, to achieve a large single longitudinal mode tuning range, elements with a wide free spectral range (FSR), corresponding to a small optical path length, are typically required. Many architectures have been proposed, some based on diffraction gratings, such as sampled gratings distributed Bragg reflectors (SG-DBR), microring lasers etc. However, many of the proposed solutions aim to improve only linewidth or tunability, often trading off on the other one.

In order to achieve both low linewidth and broad tuning range a cascaded multi ring approach may be employed. This approach exploits large ring cavities designed to leverage the Vernier effect. In practice the free spectral range of each ring cavity is designed to be slightly different from the other ones. Thanks to the Vernier effect, if two cavities with an FSR difference of 10% are cascaded, only one of every ten resonances will overlap. Moreover, shifting (e.g. by thermally tuning) one of the ring cavities resonance by just 10% of its FSR will correspond to a cascaded resonance shift of an entire FSR. In this way the cascaded microring approach allows to obtain a narrow linewidth, thanks to the high quality factor ring resonator, with improved tuning range. Cascading more ring resonator structures may further improve single longitudinal model wavelength span.

In order to achieve a laser source with simultaneously narrow linewidth, broad single mode tuning range and high side-mode suppression ratio (SMSR), common solutions, such as distributed feedback (DFB), distributed Bragg reflector (DBR) or sampled-grating-DBR (SG-DBR) architectures are not enough. Such solutions, indeed, if they can provide a broad tuning range, such as SG-DBR, typically have broad linewidth (MHz range), while if they can provide narrow linewidth, such as DFB lasers, they have a very limited tuning range (few nm). Alternatives exist and are currently studied. One high performance laser architecture is to create an external cavity laser configuration based on mechanically tuned diffraction gratings. This architecture, which may be employed in bench-top test equipment can be designed to provide extremely wide tuning range (up to over 100 nm around the communication band), narrow linewidth (tens to hundreds of kHz) and extremely high side mode suppression ratio (above 50 dB). Such a solution is however bulky and not easy to integrate.

Figure 1:
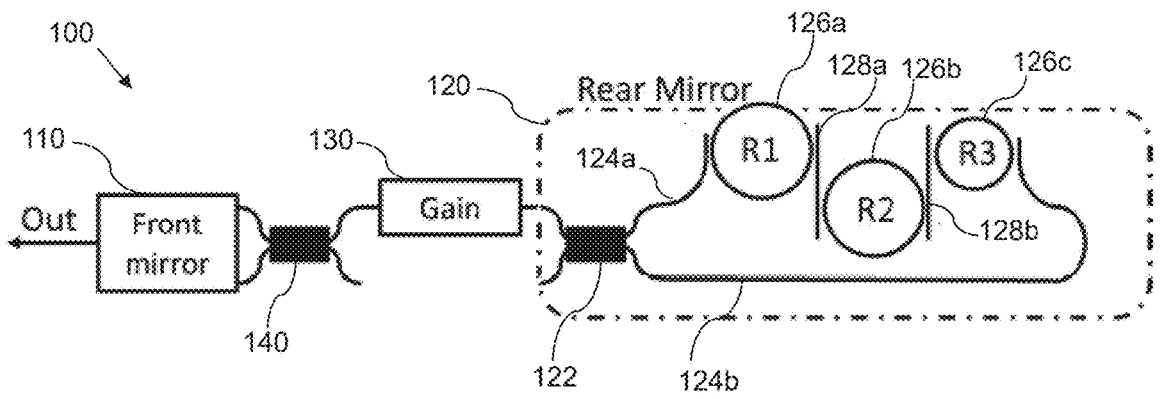
FIG. 1 shows an example of a laser implementing a plurality of ring resonators, as may be found in the state of the art.

Integrable alternatives exploit the Vernier effect between multiple long high quality factor cavity resonator elements. A common resonator element is a large radius microring structure. If we consider a single resonator structure, a reduction in the laser linewidth would typically lead to the reduction of the structure free spectral range (FSR) and consequently to the laser single mode tuning range. If multiple resonators with slightly different FSR are cascaded (as depicted in FIG. 1), the free spectral range of the cascaded structure can be drastically increased. Using the Vernier effect, if two structure have a 10% difference in their FSR, only one of every ten resonances of the two structures will overlap, thus increasing the FSR by about ten times. Such a structure can provide excellent linewidth, however, in order to achieve a large single longitudinal mode tuning range, it requires to cascade several large ring resonators, or to introduce in the cascade a large free spectral range filtering element. Using many large radius rings poses an issue in terms of structure size, and consequently cost. On the other hand, a ring resonator element with an FSR of several tens of nm or greater, will require a considerably small radius (sharp waveguide bending). This second approach, feasible in some silicon photonics platforms, cannot be used in ultra-low loss fabrication platforms, such as silicon nitride or a large waveguide low loss platform, if not paying the penalty of ultra-high cavity loss and consequently a drastic reduction in laser performance.

In some embodiments, an architecture as disclosed herein achieves a narrow linewidth laser, with broad tuning range and high SMSR, that uses, compared to alternate solutions, a reduced number of large radius ring resonators, without the need to introduce sharp bending radius structures.

Some embodiments include a cascaded microring-Fabry-Perot tunable laser architecture able to achieve narrow linewidth, broad tuning range and high side mode suppression ratio (SMRS). Such embodiments may exploit one or multiple high quality factor add-drop microring resonators, cascaded with a single wide free spectral range (FSR) Fabry-Perot (FP) resonator. An example of such a configuration is depicted in FIG. 4. An optical broadband gain section is connected on one side to the cascaded microring-FP mirrors. The proposed structure acts as a frequency selective mirror. The light coming from the gain section travels along the cascaded structure. At each microring, only the frequency components matching the resonant frequencies of the resonators propagate to the "Drop" of the ring, toward the following filter elements. All the other components are dissipated through a high loss propagation region connected to the "Thru" port of the microring. If multiple microrings are cascaded, only the frequency components matching the resonant frequencies of all the cascaded structure are preserved. Using the Vernier effect, if the FSR of two cascaded structures differs by 10%, only one every ten microring FSRs will match such condition, thus allowing a considerable increase in the cascaded filter FSR.

The frequency components filtered by the cascaded microrings are then fed to the Fabry-Perot resonator. The Fabry-Perot resonator is designed to have only one reflection resonance matching with the cascaded microrings; only such frequency component is reflected into the laser cavity. Differently from some FP filters, where the cavity mirror determines also the cavity coupling coefficient, in some embodiments the FP cavity is evanescently coupled to the input/output optical waveguide using a directional coupler structure FIG. 3. The directional coupler based FP allows to independently design mirror reflectivity and cavity coupling strength, thus introducing an additional optimization degree of freedom, to fine tune the FP resonator response to achieve the best laser performance. As such, the Fabry-Perot cavity and the directional coupler together form a reflective filter (or "Fabry-Perot filter") which preferentially reflects wavelengths in certain wavelength ranges. The spectral components reflected by the FP cavity travel once again through the cascaded microrings, thus improving the overall SMSR. As a front mirror, a wideband high reflectivity coating, or a tunable reflector, such as a Sagnac mirror can be used. The adoption of the wide FSR FP cavity allows to reduce the total number of large radius ring resonators, thus allowing a reduction in laser area/cost. The area reduction can be estimated to be about 30% if switching from a 3-ring configuration to a 2-ring+1FP configuration. Moreover, differently from a microring structure, the FP cavity may be built exploiting a straight waveguide section, which allows to design an almost arbitrary small FP cavity (large FSR), without introducing excess loss associated with waveguide bending.

The architecture of the present disclosure is based on a directional coupler-based FP structure. Some embodiments use components such as a passive directional coupler, a waveguide phase shifter and a reflector. Such components are readily fabricated in many accessible foundry processes. In some embodiments, mirror reflectivity and cavity coupling strength can be independently controlled, this may simplify the system design and enable more accurate optimization especially with cascaded elements. Some embodiments adopt a combination of both microring and FP cavity, thus combining the filtering properties of the two different structures.

Some embodiments combine one or more high quality factor microring cavities and one or more large free spectral range Fabry-Perot resonators to construct a tunable single mode laser cavity. Some embodiments exploit the Vernier effect among the resonating elements to allow a widely tunable, high side mode suppression ratio and ultra-low linewidth laser cavity (and consequently optical emission). Some embodiments will allow a significant device area/cost reduction, keeping similar performance compared to a state of the art widely tunable ultra low linewidth laser.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%. Although exemplary embodiments of a laser have been specifically described and illustrated herein, many modifications and variations will be apparent to those skilled in the art. Accordingly, it is to be understood that a laser constructed according to principles of this invention may be embodied other than as specifically described herein. The invention is also defined in the following claims, and equivalents thereof.

In addition to the disclosure above, the present invention may be understood with reference to the below clauses:

A1. A laser comprising: a first ring resonator; and a Fabry-Perot filter connected in cascade with the first ring resonator.

A2. The laser of clause A1, wherein the Fabry-Perot filter comprises: a Fabry-Perot cavity comprising a first waveguide; and a second waveguide, coupled by evanescent coupling to the first waveguide.

A3. The system of clause A2, wherein the second waveguide is connected to the first ring resonator.

A4. The system of any of clauses A1 to A3, wherein the Fabry-Perot filter is a reflective filter.

A5. The system of any of clauses A1 to A4, further comprising a second ring resonator, connected in cascade with the first ring resonator.

A6. A laser as substantially disclosed herein.

What is claimed is:

1. A laser comprising:

a ring resonator structure; and a Fabry-Perot filter connected in cascade to the ring resonator structure by a coupling waveguide, wherein the coupling waveguide is configured to propagate light having a frequency corresponding to any of the resonant frequencies of the ring resonator structure to the Fabry-Perot filter, and the Fabry-Perot filter is configured to select one or more frequencies and return light having a frequency matching any of the selected frequencies to the ring resonator structure via the coupling waveguide, wherein the ring resonator structure comprises a plurality of ring resonators, each connected to one another in cascade, wherein each pair of adjacent ring resonators is connected by a respective connecting waveguide, wherein one or more of the connecting waveguides is a straight waveguide, wherein the coupling waveguide is a first coupling waveguide, and a first ring resonator amongst the plurality of ring resonators is connected to a gain medium of the laser by a second coupling waveguide, wherein a last ring resonator amongst the plurality of ring resonators is coupled to the first coupling waveguide, and wherein the first ring resonator is coupled to the second coupling waveguide by evanescent coupling.

2. The laser according to claim 1, wherein the ring resonator structure together with the Fabry-Perot filter define a reflective end of a laser cavity of the laser.

3. The laser according to claim 2, wherein the ring resonator structure together with the Fabry-Perot filter define a rear mirror of the laser cavity.

4. The laser according to claim 1, wherein the Fabry-Perot filter is defined by a straight waveguide configured to operate as a Fabry-Perot cavity; and a coupling region of the coupling waveguide, wherein the Fabry-Perot cavity is coupled to the coupling region of the coupling waveguide.

5. The laser according to claim 4, wherein the coupling waveguide comprises a back-end high-loss propagation region, wherein the coupling region of the coupling waveguide is located between the ring resonator structure and the back-end high-loss propagation region.

6. The laser according to claim 1, wherein the coupling waveguide comprises a front-end high-loss propagation region, wherein the ring resonator structure is coupled to the coupling waveguide at a position along the coupling waveguide between the Fabry-Perot filter and the front-end high-loss propagation region.

7. The laser according to claim 1, wherein the second coupling waveguide comprises a high-loss propagation region, wherein the ring resonator is coupled to the second coupling waveguide at a position along the second coupling waveguide between the gain medium and the high-loss propagation region.

8. The laser according to claim 1, wherein one or more of the connecting waveguides comprise: a respective high-loss propagation region, wherein each of the ring resonators is coupled to a corresponding one or more of the connecting waveguides at a position along said connecting waveguide distal from the respective high-loss propagation region.

9. The laser according to claim 8, wherein one or more of the connecting waveguides having a high-loss propagation region further comprise: a further high-loss propagation region, wherein each of the ring resonators coupled to the respective connecting waveguide are coupled at positions along the respective connecting waveguide between the high-loss propagation regions.

10. The laser according to claim 1, wherein the second coupling waveguide comprises a high-loss propagation region, wherein the first ring resonator is coupled to the second coupling waveguide at a position along the second coupling waveguide between the gain medium and the high-loss propagation region.

* * * * *